US005653519A

United States Patent [19]
Dobbs

[11] Patent Number: 5,653,519
[45] Date of Patent: Aug. 5, 1997

[54] FIBER OPTICS ILLUMINATOR SYSTEM

[75] Inventor: William Charles Dobbs, Burbank, Calif.

[73] Assignee: Glass Illuminations, Inc., Sun Valley, Calif.

[21] Appl. No.: 480,422

[22] Filed: Jun. 5, 1995

Related U.S. Application Data

[63] Continuation of Ser. No. 168,759, Dec. 16, 1993, abandoned

[51] Int. Cl.⁶ ............................................. F21V 15/00
[52] U.S. Cl. ............................. 362/32; 362/96; 362/373
[58] Field of Search ........................... 362/32, 96, 293, 362/294, 264, 373, 376; 454/184, 356

[56] References Cited

U.S. PATENT DOCUMENTS

| | | | |
|---|---|---|---|
| 3,364,838 | 1/1968 | Bradley | 454/184 |
| 4,025,779 | 5/1977 | Ahroni | 362/32 |
| 4,623,217 | 11/1986 | Hallén | 362/32 |
| 4,704,660 | 11/1987 | Robbins | 362/293 |
| 4,740,870 | 4/1988 | Moore et al. | 362/32 |
| 4,747,022 | 5/1988 | Lin | 362/32 |
| 4,763,984 | 8/1988 | Awai et al. | |
| 4,825,341 | 4/1989 | Awai | 362/32 |
| 4,922,385 | 5/1990 | Awai | 362/373 |
| 4,933,815 | 6/1990 | Parthasarathy | 362/32 |
| 4,957,347 | 9/1990 | Zarian | |
| 5,016,152 | 5/1991 | Awai et al. | 362/293 |
| 5,052,778 | 10/1991 | Jamshid | |
| 5,067,831 | 11/1991 | Robbins et al. | |
| 5,111,367 | 5/1992 | Churchill | 362/32 |
| 5,187,764 | 2/1993 | Hixon et al. | |
| 5,335,144 | 8/1994 | Maroushek | 454/184 |
| 5,351,172 | 9/1994 | Attree et al. | 362/373 |
| 5,479,322 | 12/1995 | Kacheria | 362/32 |

*Primary Examiner*—Ira S. Lazarus
*Assistant Examiner*—Sara Sachie Raab
*Attorney, Agent, or Firm*—Bruce A. Jagger

[57] ABSTRACT

An optical fiber illuminator system in which a stream of air under the urging of an air moving device such as a fan is drawn in through an air intake zone and discharged through a more restricted air exhaust zone of an illuminator case. The fan is located intermediate the air intake and exhaust zones. By reason of such restriction there is a slight positive pressure down stream from the fan. The fan is thus caused to run more quietly. The operative components within the case are protected from liquid moisture by means of a moisture collecting gutter which funnels moisture away from the operative zones of the illuminator.

19 Claims, 7 Drawing Sheets

FIBER OPTICS ILLUMINATOR SYSTEM

This is a continuation of application Ser. No. 08/168,759, filed Dec. 16, 1993 now abandoned.

BACKGROUND OF THE INVENTION

1. Field of the Invention

The invention relates in general to fiber optic illuminators and, in particular, to fiber optic illuminators which are light tight, very quiet, thermally protected and protected from moisture damage.

2. Description of the Prior Art

Previous fiber optics light generating systems have recognized that thermal protection is necessary for the various components within the light generating system, the light conduit and the surrounding environment. See, for example, Awai U.S. Pat. Nos. 4,825,341 and 4,922,285, and Robbins U.S. Pat. No. 4,704,660. Previous expedients generally did not recognize that the presence of those elements and features which are necessary to provide good thermal protection is generally inconsistent with the objectives of no light leakage, very low noise level and moisture exclusion. It was not generally appreciated that the utilization of a very open air flow path or labyrinth for cooling purposes is not inconsistent with these objectives provided the air outlet is somewhat more constricted than the air inlet. It is believed that this constriction results in the formation of a region of positive pressure within the illuminator, the formation and benefits of which were generally not previously appreciated. In general the components of previous fiber optics illumination systems included a high intensity light source, a color wheel or filter assembly, a fan assembly and a low output voltage transformer all mounted within a closed case. Optionally, hot or cold mirrors were previously utilized to reflect visible light and absorb or pass infrared and ultraviolet light. It was generally not appreciated that heavy wattage light bulbs, up to as much as 500 watts or more, could be used as the light source without causing thermal damage and without complicated and expensive heat sinks or other heat dissipation expedients in a system with no light leakage, very low noise emission and with moisture protection. The significance of liquid moisture protection was generally not appreciated.

These and other difficulties of the prior art have been overcome according to the present invention.

BRIEF SUMMARY OF THE INVENTION

A preferred embodiment of the fiber optic illuminator system according to the present invention comprises an illuminator case and a chassis mounted within the case. The case is adapted to be mounted vertically, for example, on a wall. Air is directed through the vertically mounted system from the bottom to the top. The system is generally divided into zones which, from bottom to top, generally according to one preferred embodiment comprise an air inlet zone, a power zone, an air passage zone, a light generating zone and an air exhaust zone. A moisture drain zone which is physically separated from the light generating and power zones and generally extends between the air exhaust and air intake zones, serves to return any liquid moisture which enters or forms in the air exhaust zone to the air inlet zone. Thus, one embodiment is adapted to be used in an exterior environment where it is exposed to the elements, such as rain. Other embodiments are adapted to be used in interior environments where liquid moisture exclusion is not a problem. Fiber optics illuminator systems according to the present invention may be utilized in fixed or portable configurations. Where a single compact unit is not desired the power and control elements which normally occupy the power zone may be placed elsewhere outside of the unit, and the power zone reduced in size or eliminated.

The air passage zone is generally positioned between and serves to separate the power and light generating zones. The air passage zone generally includes an air transport member such as, for example, a motor driven fan, which is positioned to move air upwardly through said system. If desired a plurality of fan assemblies may be used, each of which can have the same or a different capacity from the others. Preferably, the light generating zone is sealed from the power zone by a baffle which is closed except for the passageway in which the fan is located.

The power zone generally includes a low output voltage transformer, power input and output jacks, switches, controls and associated wiring. The wiring harness is conveniently attached to a terminal strip which is mounted for easy access on a terminal strip mounting bracket. The terminal strip mounting bracket is designed and placed so that the flow of cooling air through the power zone is not substantially impeded. The components which normally are placed in this zone may be provided externally of the illuminator case, if desired. One set of power and control components may, for example, service several units.

The light generating zone generally includes a light source and associated mounting brackets and mirrors, if any. The light source may, for example, be adjustably mounted on a bracket so as to accommodate various shapes and sizes of bulbs and reflectors. Mirrors may be used to modify and/or reflect the light so that it exits the case at the desired angle and with the desired characteristics. A mirror which is reflective of some wavelengths and transparent to others may, for example, be used to remove certain undesired wavelengths from white light. Heat, for example, may be controlled in this way. If, for example, both infrared and ultraviolet are removed from the light so as to protect the fibers in the fiber optic cable, the considerable heat which will thus be generated within the light generating zone must be effectively dissipated.

A color wheel or light filter zone is preferably provided so as to modify the color of the light which is discharged from the system and to provide an environment for the exposed ends of the fiber optics filaments which is different from that in the light generating zone. Generally it is cooler in the light filter zone than in the light generating zone, and the exposed ends of the fibers or filaments are protected from ultraviolet and infrared radiation. Where a light filter zone is provided it generally includes a motor driven transparent or translucent disc which is mounted for rotation generally within the plane of the disc. The disc may be colored with either a mono-color or different colors in different sectors. The disc is positioned to intersect the light beam at an angle which is approximately normal to the plane of the disc. Suitable indexing elements such as notches on the periphery of the disc or other sensor detectable indicia may be used, if desired, to provide input as to the disc's position to suitable control devices. The movement of the disc may thus be controlled so as to provide the desired light color output. As will be understood by those skilled in the art, other forms of light filters may be used if desired.

The air inlet and exhaust zones generally include a series of baffles which define a light impervious labyrinth. The walls of the labyrinths at both the intake and exhaust zones are preferably coated with a black non-reflective coating so that light is not reflected within the labyrinths. The placement of the baffles is such that wide air passages are provided, but there is no straight unobstructed line of sight through the zones.

The cross-sectional area provided for the air flow in the air exhaust zone is preferably significantly less than it is in the air intake zone. Thus, it is believed that a slight positive pressure forms within the case down stream from the fan or fans. The fan must labor against this load which causes it to run more quietly than would be the case if there were no positive pressure. The constriction of the airflow down stream of the air transport member should be sufficient to reduce the noise generated by the operation of the air transport member, which may, for example, include one or more fans, by an amount which is detectable to the normal human ear within two feet of the illuminator case. Also the constriction of the air flow down stream of the air transport member should be sufficient to increase the temperature of the exhaust air by at least about 3 degrees as compared to a structure where the degree of constriction in the intake and exhaust zones is about the same.

In one configuration, for example, the air inlet zone comprises a rectangular inlet port and a rectangular outlet port spaced therefrom with a rectangular intake baffle plate mounted intermediate these two ports. The ports are, for example, of approximately the same size and positioned one above the other in generally parallel planes so that they approximately register with one another. The intake baffle plate is significantly larger than the ports and is mounted in a generally parallel plane between the ports. A longitudinal axis of the case which passes approximately through the centers of the ports also passes approximately through the center of the intake baffle plate. Thus, the intake baffle plate overlaps the ports so that light can not pass through the intake zone. In general the intake baffle plate is from approximately one and one-third to two times as wide as the ports. The cross-sectional area of each of the respective ports is preferably approximately one-third that of the rectangular case, and that of the intake baffle is preferably approximately on-half that of the case. The ports are preferably spaced apart by an amount which is approximately equal to the width of the ports. There is thus a large air passageway in the air intake zone which is impervious to light.

The configuration of the baffles in the air exhaust zone is preferably somewhat different from that in the air intake zone in an embodiment which is intended for exterior use. In one preferred exterior use configuration, for example, the exhaust end of the case is closed with a cap which is axially spaced from a generally rectangular discharge port in the exhaust end of the case. The cap is preferably spaced from the exhaust end of the case by an amount approximately equal to the width of the discharge port. The cap is larger than the case in at least one dimension so as to define a generally downwardly opening exhaust port. An exhaust baffle is positioned generally between the light generating zone and the discharge port. The discharge port is generally co-axial with the exhaust baffle plate in the same sense that the intake and outlet ports are co-axial with the intake baffle plate. The cross-sectional area and positioning of the exhaust baffle plate relative to the exhaust port are similar to those of the intake baffle plate relative to the intake port so that the exhaust baffle plate overlaps the discharge port to a substantial degree. In general the exhaust baffle plate is from approximately one and one-third to two times as wide as the discharge port. The spacing of the components and the cross-sectional areas of the various ports and passageways in the labyrinth in the air exhaust zone are somewhat less than those in the air intake zone so that there is some restriction in the air exhaust zone to the passage of air. In general the discharge port and exhaust baffle plate are rectangular and the discharge port is approximately one quarter the width of the case. Where an embodiment is intended for use in an interior environment a cap is not necessary and the construction of the exhaust zone, except for the degree of constriction, can be substantially the same as that of the intake zone.

Alternative arrangements for the ports and baffling in the air intake and exhaust zones may be employed if desired. Light impervious labyrinths may be achieved, for example, by the use of two or more plates with multiple perforations therein arranged so that the perforations are offset from one another when viewed axially. The perforations may be of any configuration. The relative constriction at the air exhaust zone may be accomplished, for example, by providing exhaust perforations in one plate, the total cross-sectional area of which is less than the total cross-sectional area of the intake perforations in the most constricted plate at the air intake zone. In general the plate with the smallest total cross-sectional area of perforations in any one zone controls the air flow through that zone. In one preferred embodiment the air intake zone includes an intake plate and an outlet plate each of which has a single large rectangular perforation. The necessary labyrinth is provided by an intermediate intake baffle plate which may be viewed as an intermediate plate with two rectangular perforations therethrough. The cross-sectional area of each of the respective intake and outlet plates is approximately equal to the combined cross-sectional area of the two rectangular perforations in the intermediate plate. A reduction in the cross-sectional area of any of these perforations would limit the air flow through this zone. In one preferred embodiment the discharge port in the air exhaust zone serves to constrict the air flow. The two perforations provided by the exhaust baffle plate have a much larger combined cross-sectional area than the single perforation which forms the discharge port. The total cross-sectional area of the air flow in the most constricted region of the air exhaust zone is generally approximately 3 to 30 and preferably approximately 6 to 15 percent smaller than the total cross-sectional area of the air flow in the most constricted region of the air intake zone. In general the total cross-sectional area of air flow in the most constricted region of the air intake zone is from approximately one-quarter to one-half the total cross-sectional area of the interior of the illuminator case so that there is provision for substantial air flow through the case. As will be understood by those skilled in the art, other means may be employed to cause the formation of what is believed to be a slight positive pressure within the illuminator case down stream of the fan assembly. In general the light generating zone is positioned down stream of the fan assembly where the slight positive pressure and the turbulence generated by the fan promotes heat transfer from the high intensity light source to the flowing air stream. The constriction of the air flow in the air exhaust zone is preferably sufficient to increase the exhaust temperature of the air by from approximately 5 to 20 and preferably from approximately 8 to 15 degrees Centigrade as compared with unconstricted air flow.

Alternatively, the normal operating noise of the fan may be quieted by using specially configured fan blades. For example, noise may generally be reduced by using fan blade tips which are formed to extend generally parallel to the axis of rotation of the blade in the down stream direction, or by otherwise specially configuring the fan blades.

The air exhaust zone in an embodiment which is intended for exterior usage is provided with a moisture barrier which prevents liquid moisture from entering the light generating zone. The moisture barrier comprises, for example, a shallow V-shaped exhaust baffle which is mounted to a rear wall of the case so that the channel or gutter formed by the apex of the V-shaped exhaust baffle slopes slightly downward and rearwardly. A liquid drain port is formed in the exhaust baffle at the lowest and most rearwardly located part of the gutter. Thus, moisture which fall or collects on the exhaust baffle is funnelled onto the inner surface of the back wall of the case.

One side of the moisture drain zone is preferably defined by the rear or back wall of the case where the moisture gutter discharges. The moisture drain zone is preferably unobstructed all the way down to the inlet port so that any liquid which falls on the exhaust baffle plate is either evaporated in the moisture drain zone by the heat from the operating components or flows under the urging of gravity down the back wall of the case, through the air intake zone and out of the inlet port.

Most of the operating components in the fiber optics illuminator system are preferably mounted on a chassis which is mounted within the case on stand-offs so as to space the chassis from the rear wall of the case. The chassis serves as a heat sink and to protect the exterior of the case from being heated to the degree that it becomes a safety hazard. The chassis also serves to mount and position at least the heat generating elements of the system. The chassis preferably includes a main plate which is mounted to and spaced from the rear or back wall of the case, an air passageway plate, and a motor plate, and may also include a terminal strip mounting bracket and a control plate. The air passageway generally serves to mount what is in effect a shrouded fan or fans between the power and light generating zones and to prevent the flow of air between these zones except through that fan. The motor plate serves to separate the light generating zone from the Color wheel zone and to mount the motor which rotatable drives the color wheel. In general the light mounting bracket and the mounting bracket for any mirror may be mounted to either the main plate or the motor plate. The power transformer and at least some of the wiring components are generally mounted to the main plate or the terminal strip bracket in the power zone. Controls and power input and output jacks are conveniently mounted to a control plate. The control plate may be mounted in or adjacent to an access port in the case so that the controls and jacks are readily accessible to the operator. The case is preferably closed with a light tight lid.

BRIEF DESCRIPTION OF THE DRAWINGS

Referring particularly to the drawings for the purposes of illustration and not limitation.

DETAILED DESCRIPTION OF THE PREFERRED EMBODIMENTS

In the preferred embodiment which has been selected for purposes of illustration, and with particular reference to the drawings, there is illustrated generally at 10 a fiber optics illuminator system comprising a plurality of zones defined within a case member 12. This preferred embodiment is adapted to be mounted in an exterior position where it is exposed to the elements, particularly rain. The selection of an exterior embodiment for purposes of illustration is not to be construed as a preference for exterior over interior mounted embodiments. A chassis or frame member indicated generally at 14 is adapted to be mounted within case member 12 to support certain of the power and light generating elements of the system. The fiber optics illuminator system 10 is adapted to be mounted vertically by means of mounting tabs 13. The normally upper end of case 12 is covered, for example, by a cap member 16. One normally vertical side of case 12 is preferably open so as to permit access to its interior. The open side of case 12 is closed in a light tight fashion by, for example, a lid member 18. The zones which are generally defined within the case 12 include, for example, an air intake zone 20 located at the normally lower end of case 12, a power zone 22, an air passage zone 24, a light generating zone 26, an air exhaust zone 28 and a light filter zone 30.

The chassis 14 includes, for example, a main or back plate 32 which serves to mount a plurality of other plates, including, a terminal strip bracket 34, a fan mounting plate 36, a motor plate 38, and a power plate 46. Power plate 46 is generally also attached to case member 12. Optionally, a bushing plate 48 is provided to further isolate the light filter zone from the case and to support the bushing. The back plate 32 is mounted to a first or rear wall 40 of case member 12 through stand-offs 42 so as to define a liquid moisture drain zone 44 between back plate 32 and rear wall 40. In general, the various components of the chassis also serve as heat sinks and barriers.

Terminal strip bracket 34 serves to mount for ease of accessibility a plurality of electrical terminals of which 50 is typical. A low voltage output transformer 52 is conveniently located within the arch formed by bracket 34. Power plate 46 serves, for example, as a convenient means to mount the controls and power input and output jacks for the system. A typical electrical input jack is indicated at 54. A typical low voltage control jack is indicated at 56. A typical control switch is indicated at 58. The controls, jacks and power elements are generally mounted on the chassis 14 within the power zone 22. A safety switch 64 cuts off the power to the systems electrical and electro-mechanical components when lid member 18 is removed. A thermal overload shut off switch 66 is mounted in what is generally the hottest location in the power zone. When the heat within the power zone 22 exceeds safe limits the switch 66 shuts the system down.

As will be understood by those skilled in the art the controls and power supply may be mounted elsewhere outside of the unit, if desired. Where there is no need for a relatively large chamber to hold controls and power components the size of the chamber may be reduced to just that which is necessary to provide a passageway for the air to flow between the air intake zone 20 and the fan assembly 60. If the baffles are arranged so that no such passageway is necessary then the power zone may be dispensed with. The constriction of the exhaust zone as compared with the intake zone provides the desired heat transfer and noise reduction functions even when the power zone is not present.

A fan assembly 60, for example, is generally mounted to fan mounting plate 36 in passageway 62 in air passage zone 24 so that substantially all of the air which flows through the case member 12 passes through the fan assembly 60.

The light generating zone 26 generally contains, for example, a high intensity light source and associated reflector indicated generally at 68, a mirror 70 and the necessary electrical wiring harness. The light source 68 is preferably mounted on a bracket which is slidably adjustable in adjustment slots 76. Slots 76 may be positioned to provide the desired degree and direction of adjustment. A color wheel drive motor 72 is mounted to motor plate 38 and rotatable drives color wheel 74. Color wheel 74 is located within light filter zone 30. A beam of light which is generated at 68 is reflected by mirror 70 through light port 78 in motor plate 38, through color wheel 74, through exit light port 80 in bushing plate 48 and into optical fiber bushing 82. Conventional optical fiber cables, not shown, conduct the light from bushing 82 to wherever its display is desired.

Light filter zone 30 includes, for example, color wheel 74 which is generally circular and mounted for rotation in its own plane under the urging of color wheel drive motor 72. Where the sectors of color wheel 74 are not all the same some indexing means is generally required so as to permit the control system to know where a desired sector is. A simple switch such as, for example, indexing switch 84 may be activated by the movement of a cam follower 86. Cam follower 86 rides on the edge of color wheel 74 as the wheel rotates and moves responsive to engagement with protuberances or indentations on wheel 74. Since the locations of any such indexing features on the rim of wheel 74 relative to the different segments of the wheel are known, and the position of the cam follower 86 relative to the light beam is known, the control system is able to position the desired wheel segment so as to intersect the light beam.

Air intake zone 20 generally includes, for example, a first perforated inlet plate 88, a second perforated inlet plate 90 and an intermediate perforated baffle plate 92. The first perforated inlet plate 88 includes, for example, a single large perforation in the form of inlet port 94. The second perforated inlet plate 90 also includes, for example, a single large perforation in the form of discharge port 100. Intermediate baffle plate 92 includes, for example, two perforations in the form of baffle perforations 96 and 98, respectively. The plates 88, 90 and 92, by reason of the off-setting of the perforations therein, form between themselves an air intake labyrinth which is very open to the flow of air but is impervious to light. The interior of the intake labyrinth is coated with a black non-reflective material so that light can not be reflected through the intake labyrinth. The cross-sectional area of the perforations in each of the respective plates in the air intake zone is approximately equal in the embodiment chosen for illustration. If desired, the perforations in any one of the plates could be reduced in area as compared to the others and that would become the limiting factor as to the volume of air which could be drawn through the intake labyrinth. The spacing between the plates in the embodiment chosen for illustration is such that the cross-sectional area of air flow between the plates is at least as large as the cross-sectional area of the air flow through the perforations in the plates. If desired, the plates could be positioned closer together so that the limiting factor to the air flow would be the spacing between the plates.

The air exhaust zone 28 includes a plurality of elements which define therebetween an exhaust labyrinth. The elements include, for example, a perforated exhaust plate 102, a perforated exhaust baffle plate 104, and cap member 16. In the embodiment chosen for illustration, the exhaust plate 102 includes a single centrally located exhaust plate perforation 110, and exhaust baffle plate 104 includes two exhaust baffle perforations 106 and 108, respectively. The perforations 106 and 108 are off-set from perforation 110 so as to form a light impervious exhaust labyrinth. Air is exhausted from the system through exhaust ports 112 and 114 which are formed between the cap member 16 and the sides of case member 12. As previously described with reference to the elements in the air intake zone 20, the most constricted of the perforations in a particular plate or the most constricted spacing between the elements in the air exhaust zone 28 determines the rate of air flow through the air exhaust zone. In the embodiment chosen for illustration the most constricted area in the air exhaust zone 28 is at the exhaust baffle plate 104. The combined area of the perforations 106 and 108 is approximately 8 to 10 percent less than that of the most constricted area in the air intake zone 20 so that the operation of fan assembly 60 causes the formation of a slightly positive air pressure in light generating zone 26. In general the only significant air inlet to the system is through inlet port 94, and the only significant air exhaust is through exhaust plate perforation 110.

The exhaust baffle plate, in the embodiment chosen for illustration, performs a further function of trapping and diverting liquid moisture away from the light generating zone 26 and into the liquid moisture drain zone 44. When the fiber optics illuminator system 10 is mounted, for example, on an exterior wall where it is exposed to the elements it is probable that liquid moisture will splash in through exhaust ports 112 and 114, onto the upper surface of exhaust plate 102 and down through perforation 110. Exhaust baffle plate 104 is slightly V-shaped with the Shallow "V" opening normally upwardly so that the bottom of the "V" forms a liquid moisture drain gutter 116. Exhaust baffle plate 104 is mounted so that it normally tips slightly downward and rearwardly towards the liquid moisture drain zone 44. A liquid drain port 118 is provided at the lowermost point of drain gutter 116. Drain port 118 is located so that it discharges into drain zone 44 at or near its normally upper end. Any liquid moisture which enters drain zone 44 normally runs down the back wall 40 of case 12 and any which does not evaporate in transit drains through the air intake zone 20 and out inlet port 94. The exhaust plate 102 is also preferably mounted so that it slopes normally downwardly away from port 110. Thus, any moisture which falls on the upper surfaces of plate 102 runs away from port 110.

As will be understood by those skilled in the art, where liquid moisture is not a problem, as, for example, in an embodiment which is intended for interior mounting, the arrangement of baffling in the air exhaust zone can be substantially the same as that in the air intake zone. The cap and drain gutter elements are not needed in an embodiment which is intended for interior mounting. Also, embodiments which are not expected to encounter any liquid moisture may be mounted horizontally or at any other desired angle.

Figure 6:
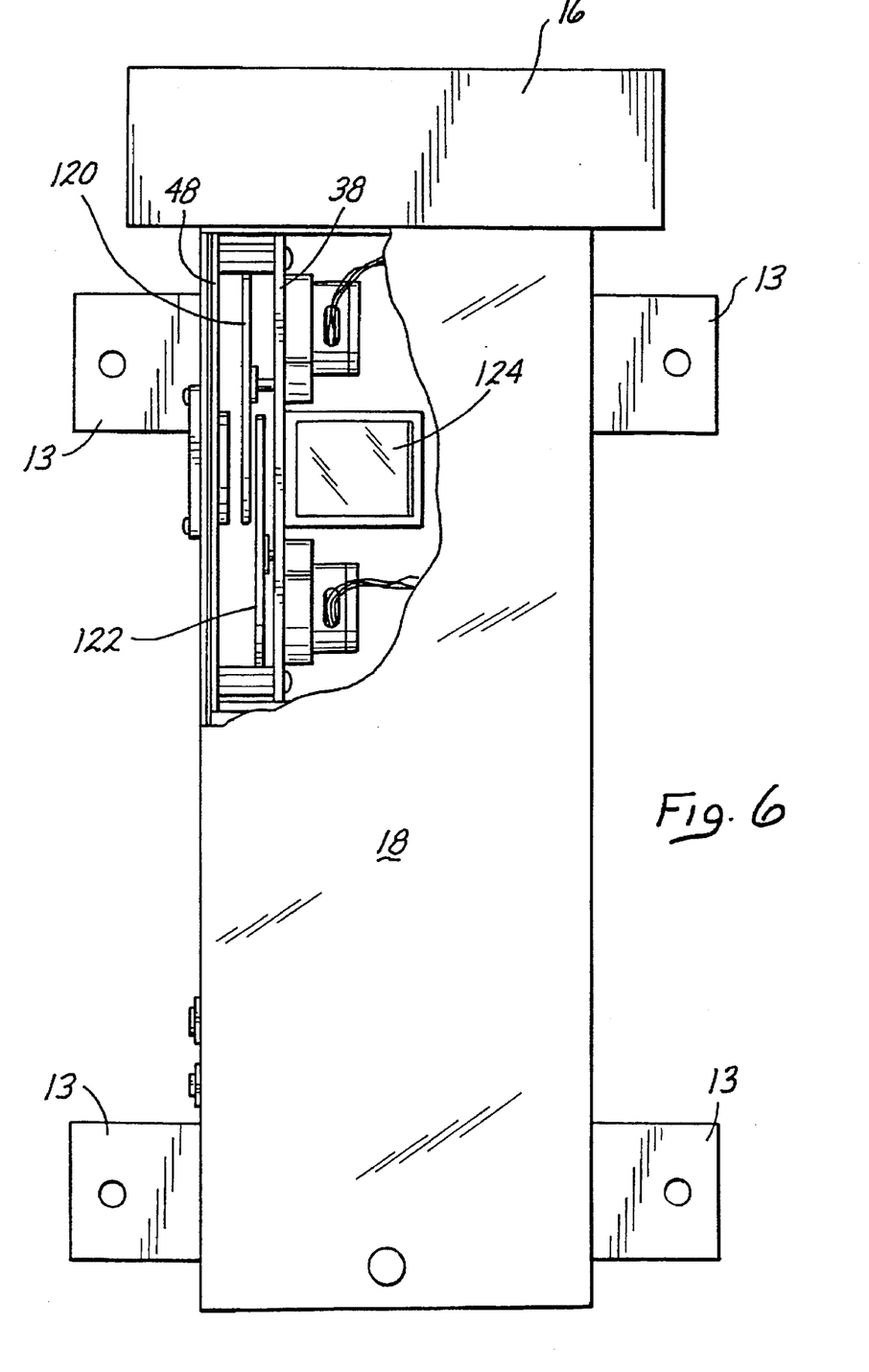
FIG. 6 is a partially broken front view of a further embodiment of the invention.

The embodiment of FIG. 6 employs a plurality of color wheels for the purpose of more closely controlling the color of the light beam which is emitted by the system 10. Each of color wheels 120 and 122 is separately driven by its own motor and mirror 124 is positioned to reflect a beam of light through the overlapping sectors of the respective color wheels.

Figure 7:
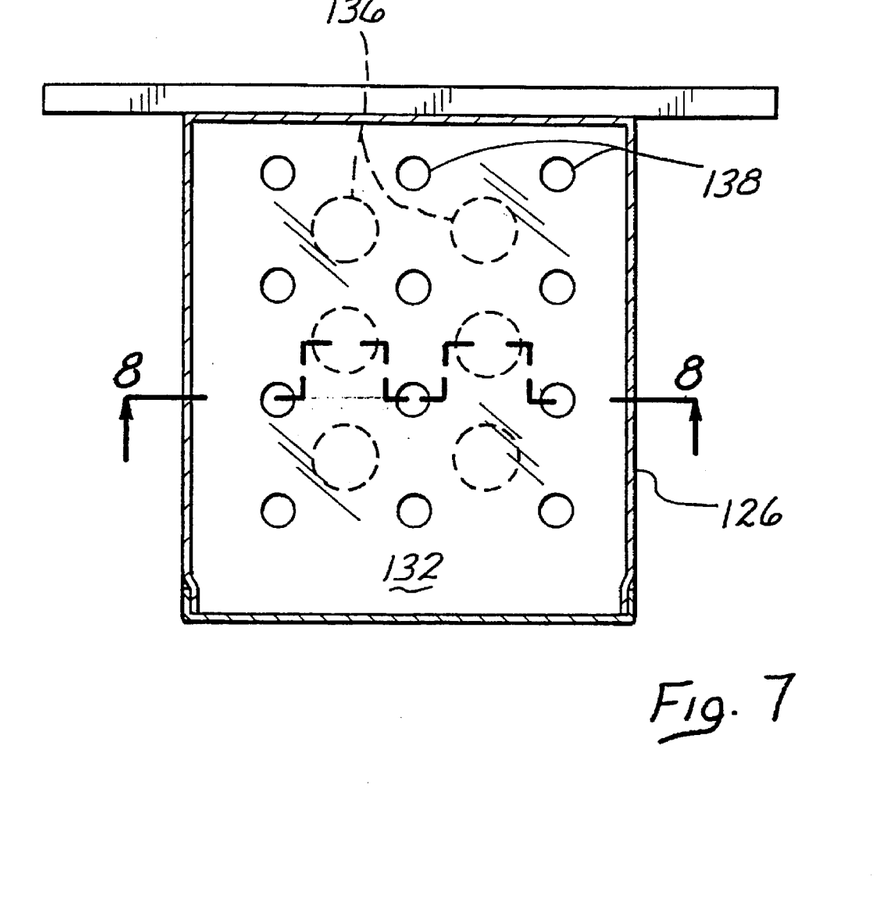
FIG. 7 is a cross-sectional view of an air intake zone in which multiple perforations are employed in each plate.
Figure 8:
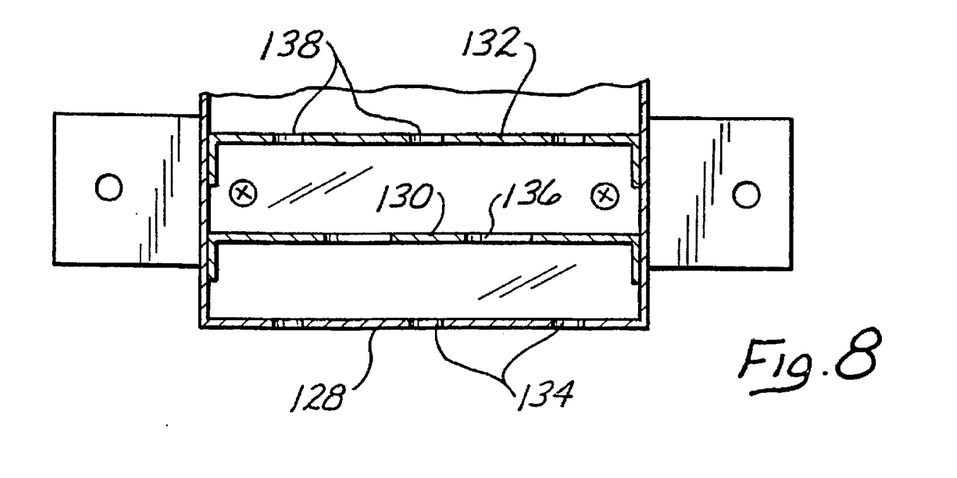
FIG. 8 is a cross-sectional view taken along line 8—8 in FIG. 7.

The embodiment illustrated particularly in FIGS. 7 and 8 is one wherein an air intake zone is provided with a plurality of multiply perforated plates in which the perforations are staggered so as to provide a labyrinth. The air intake zone is located at one end of an illuminator case 126. The labyrinth elements include, for example, a first or intake perforate plate 128, a second or baffle perforate plate 130, and a third or outlet perforate plate 132, all arranged in a stack separated from one another. Typical perforations in the respective plates include, for example, intake port perforations 134, baffle plate perforations 136 and outlet plate perforations 138. The perforations are staggered so that air passes freely through the intake zone but light does not.

In the embodiment which was chosen for the purposes of illustration, the degree of constriction of the air flow through the air exhaust zone is such that the cross-sectional area of air flow there is about 8 to 9 percent less than it is through the air intake zone. As a result the temperature of the air which is exhausted from this embodiment is approximately 10 to 12 degrees Centigrade more than it would be without the constriction. The rate of heat transfer is significantly increased by reason of the constriction of the air flow in the exhaust zone, particularly in higher wattage units.

Figure 1:
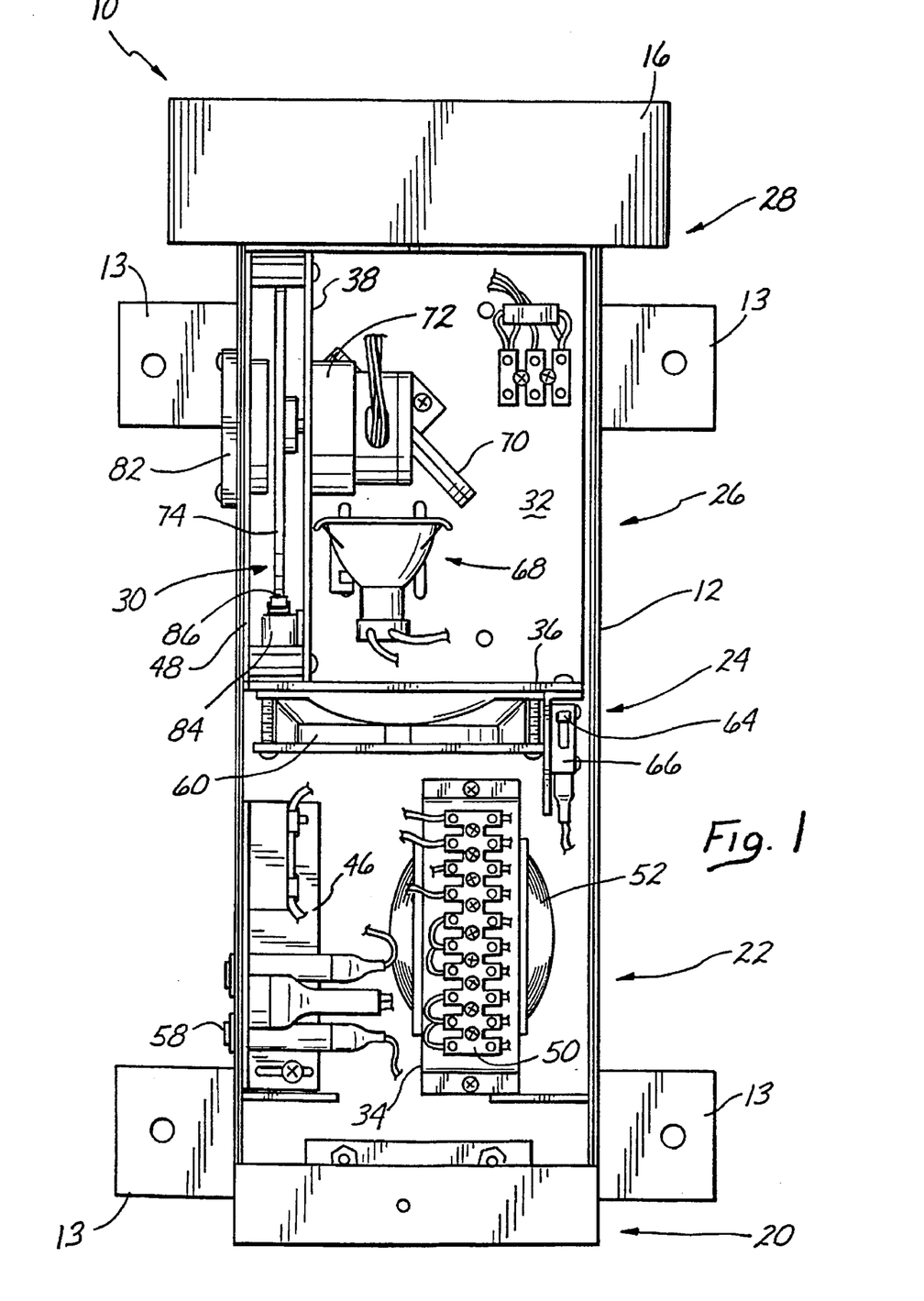
FIG. 1 is a front view of a preferred embodiment of the invention.
Figure 2:
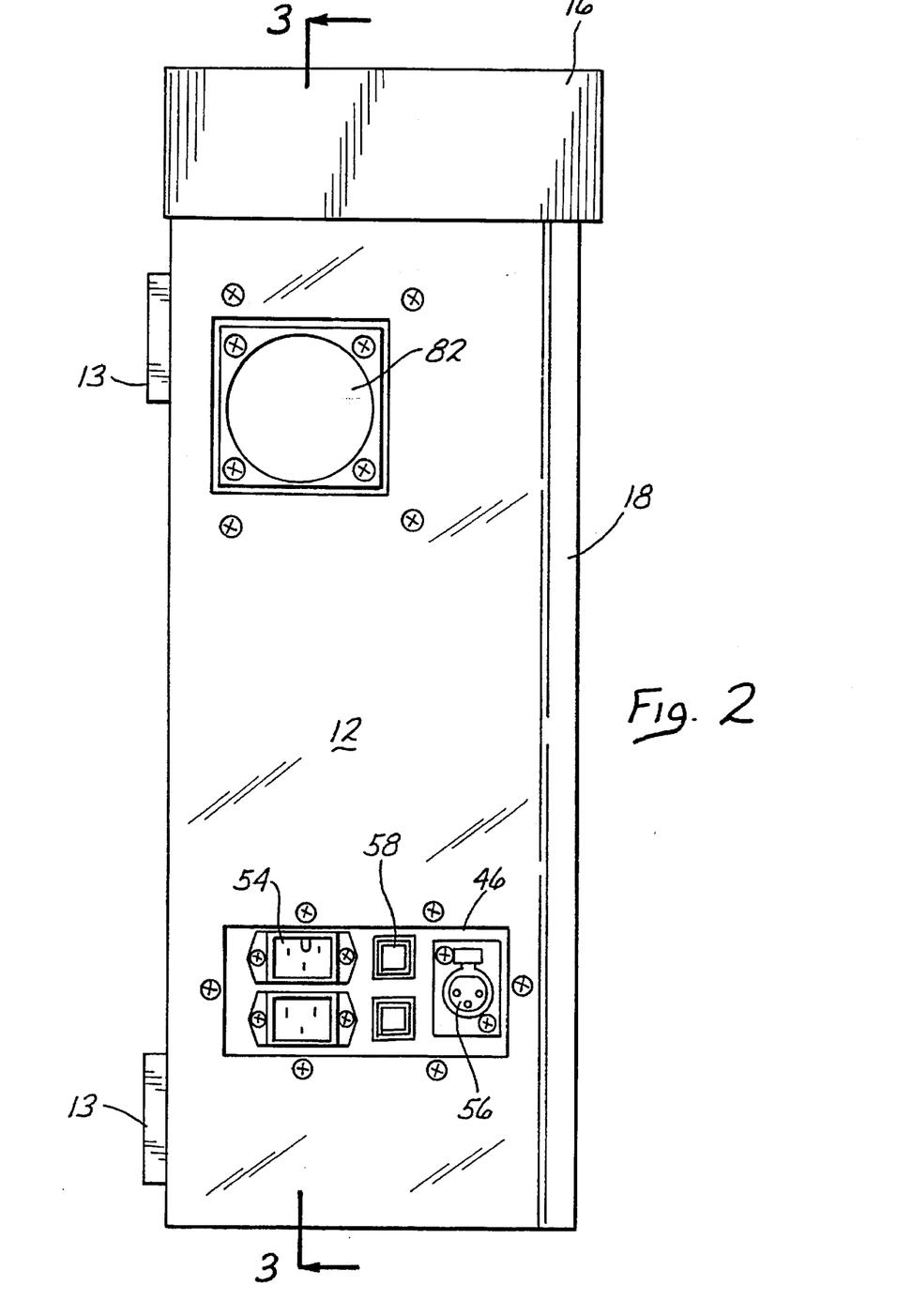
FIG. 2 is a side view of the embodiment illustrated in FIG. 1.
Figure 3:
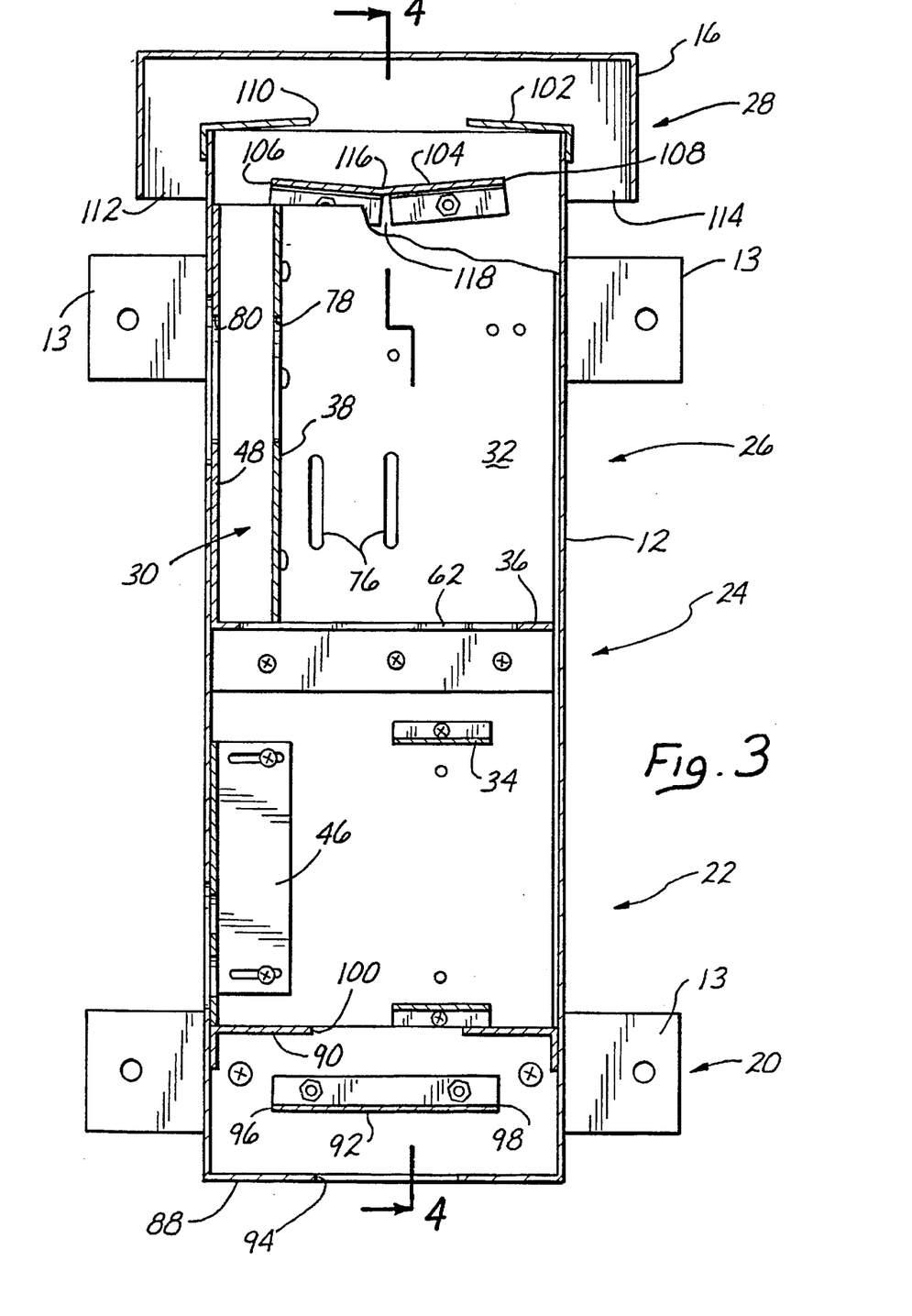
FIG. 3 is a cross-sectional view of the illuminator case and chassis without the power and light generating components taken along line 3—3 in FIG. 2.
Figure 4:
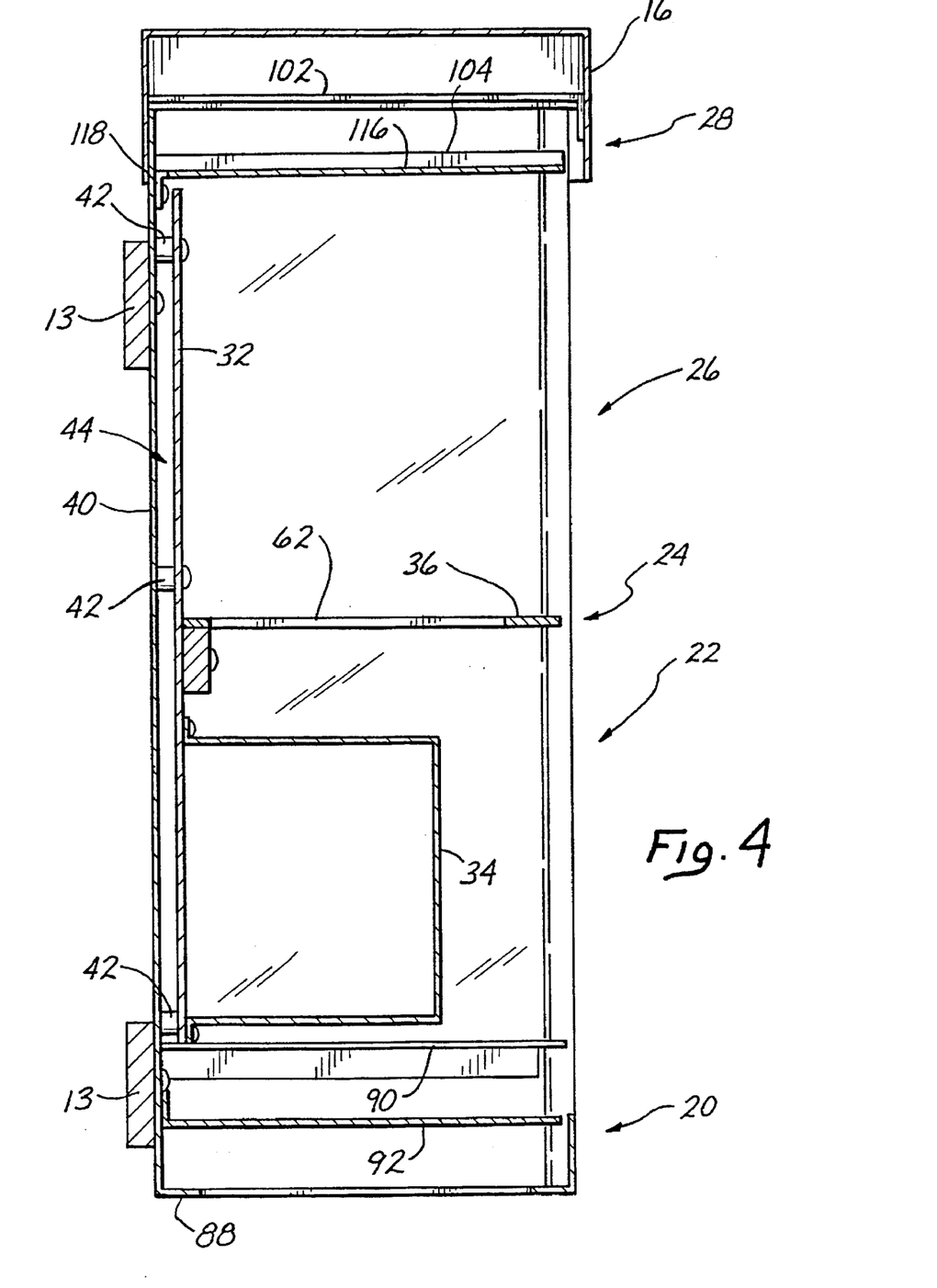
FIG. 4 is a cross-sectional view of the illuminator case and chassis only taken along line 4—4 in FIG. 3.
Figure 5:
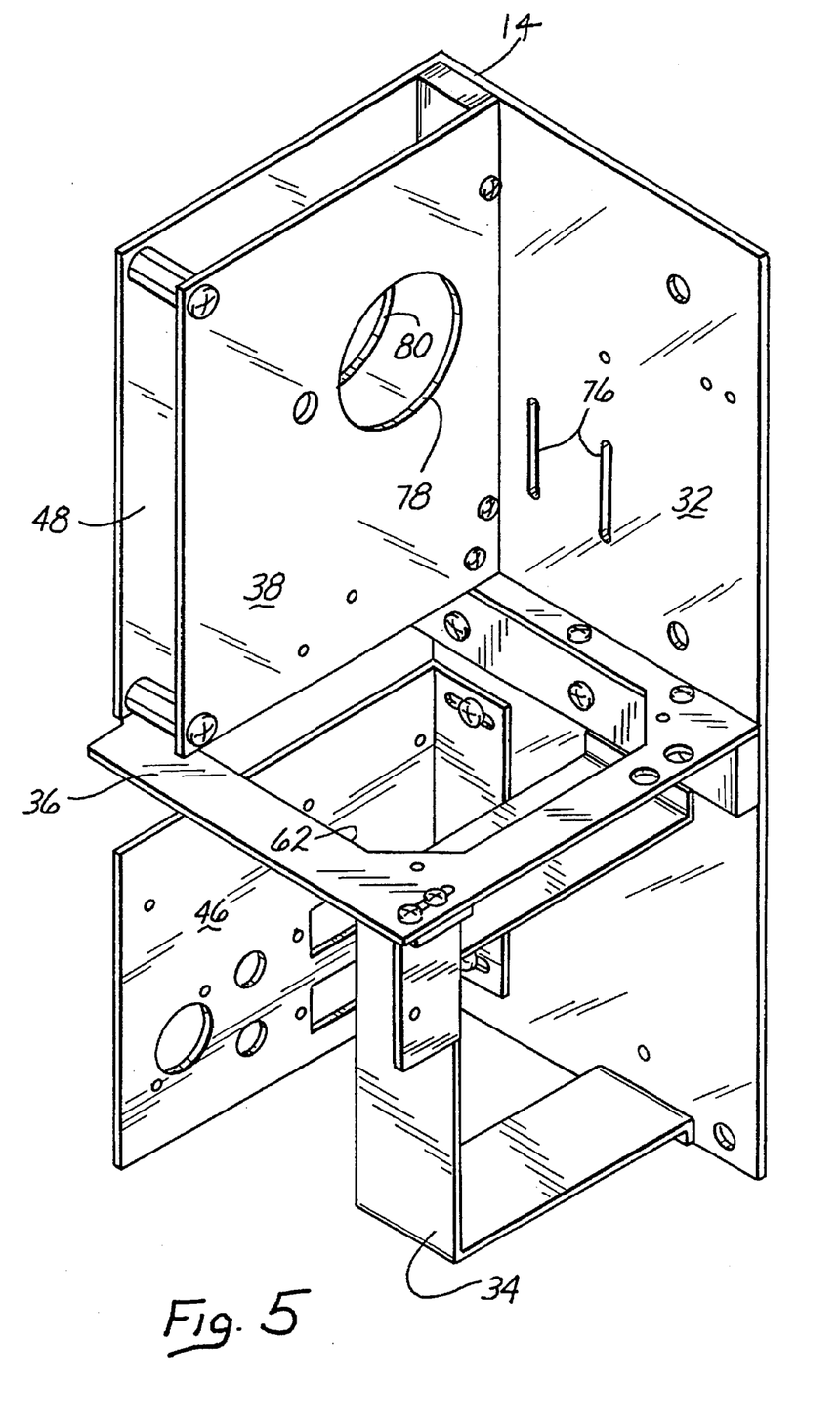
FIG. 5 is a perspective view of a chassis according to the present invention.

The motor plate 38 is preferably positioned, as shown, for example, in FIGS. 1 and 5, so that the fan assembly 60 delivers a stream of air into the light filter zone 30. This stream of air serves to cool the optical fiber bushing 82 and the end of any fiber optics cable which is mounted therein. Because of the substantial difference in the volume of the space in the light filter zone 30 as compared to the light generating zone 26 it is desirable in some embodiments to have different air flow rates in these zones. The flow rate through the light filter zone can be regulated by adjusting the baffling in that portion of the air exhaust zone 28 through which the air flow exits the light filter zone. For example, reducing the size of port 106 will decrease the flow rate through the light filter zone 30 and increase the temperature of the air which is exhausted from this zone. Likewise, enlarging port 106 will increase the flow rate through the light filter zone. Depending upon the desired condition within light filter zone 30, the normally lower edge of motor plate 38 may be positioned to divert more or less air from the air passage zone 24 through light filter zone 30.

As will be understood by those skilled in the art, the various zones may be positioned relative to one another in various configurations. For example, in less preferred embodiments the fan assembly could be positioned upstream of the air intake zone or downstream of the light generating zone. In general, in the preferred embodiments the fan assembly is intermediate the power and light generating zones so that there is a slight vacuum in the power zone and the light generating zone is slightly pressurized. The air is thus heated as it first cools the electronic components. The heated air then passes over the very hot light bulb. Thus, the electronic components receive the maximum amount of cooling and the hot air does not subject the hot bulb to an excessive amount of thermal shock. The service life of the bulb may thus be increased to as much as twice its normal length.

What has been described are preferred embodiments in which modifications and changes, substitutions and reversals of parts may be made without departing from the spirit and scope of the accompanying claims.

What is claimed is:

1. An optical fiber illuminator system comprising:
    an illuminator case adapted to be mounted generally vertically with normally lower and normally upper ends,
    a plurality of zones disposed generally within said illuminator case in anabatic communication with one another, including a generally lower air inlet zone generally adjacent said normally lower end and including perforated inlet baffle members defining a light impervious air inlet labyrinth, a power zone including a power member, a light generating zone including a light source, said light source communicating with a fiber optics bushing, an air passage zone including an air transport member generally intermediate said power and light generating zones, and a generally upper air exhaust zone generally adjacent said normally upper end and including perforated exhaust baffle members forming a light impervious air exhaust labyrinth, said power zone, light generating zone and air passage zone being generally disposed between said lower air inlet zone and upper air exhaust zone, and a moisture gutter element positioned to receive liquid moisture generally adjacent said normally upper end and guide such liquid moisture away from said light generating, air passage and power zones.

2. An optical fiber illuminator system of claim 1 including a chassis adapted to be mounted within and generally spaced from said illuminator case.

3. An optical fiber illuminator system of claim 1 including a light filter zone between said light generating zone and said fiber optics bushing.

4. An optical fiber illuminator system of claim 3 including a chassis adapted to be mounted within said illuminator case, said chassis comprising a main plate adapted to be mounted to and generally spaced from the walls of said illuminator case, an air passageway plate and a motor plate, said air passageway plate being generally positioned to separate said light generating zone from said power zone, and said motor plate being adapted to generally separate said light generating zone from said light filter zone.

5. An optical fiber illuminator system of claim 4 including a bushing plate in said light filter zone adapted to mount said fiber optics bushing.

6. An optical fiber illuminator system of claim 1 wherein said exhaust zone includes a cap extending normally over and spaced from said exhaust baffle members and defining a normally downward opening exhaust port.

7. An optical fiber illuminator system of claim 1 including a chassis adapted to be mounted within said illuminator case and generally spaced from a first wall of said illuminator case to define therebetween a generally vertically extending moisture drain channel extending generally between said moisture gutter element and said air inlet zone.

8. An optical fiber illuminator system of claim 1 wherein said air transport member is adapted to operate at a normal level of operating noise and said optical fiber illuminator system includes means for reducing the normal operating noise of said air transport member.

9. An optical fiber illuminator system comprising:
    an illuminator case,
    a chassis within and generally spaced from the walls of said illuminator case, said optical fiber illuminator system including a plurality of zones within said illuminator case in aerodynamic communication with one another, said plurality of zones comprising an air inlet zone comprising perforated inlet baffle members defining a light impervious air inlet labyrinth, a light generating zone comprising a light source, an air exhaust zone comprising perforated exhaust baffle members forming a light impervious air exhaust labyrinth, said light generating zone being generally intermediate said air inlet zone and air exhaust zone, and a gutter element positioned to deflect liquid away from said light generating zone.

10. An optical fiber illuminator system of claim 9 including a moisture drain zone separated from said light generating zone and extending generally between said air exhaust and air inlet zones.

11. An optical fiber illuminator system comprising:

an illuminator case with a plurality of zones disposed generally therein in aerodynamic communication with one another, including an air inlet zone having perforated inlet baffle members defining a light impervious air inlet labyrinth, a light generating zone including a light source, said light source communicating with a fiber optics bushing, and an air exhaust zone including perforated exhaust baffle members forming a light impervious air exhaust labyrinth, said light generating zone being generally disposed between said air inlet zone and said air exhaust zone, and an element positioned to guide liquid moisture which enters said illuminator case through a port in one of said labyrinths away from said light generating zone.

12. An optical fiber illuminator system of claim 11 wherein said element comprises part of the perforated exhaust baffle members in said exhaust labyrinth.

13. A light tight optical fiber illuminator system comprising:

an opaque illuminator case with a plurality of zones disposed generally therein in aerodynamic communication with one another, including an air inlet zone open to the ambient atmosphere having perforated inlet baffle members defining a light impervious air inlet labyrinth, a light generating zone including a light source, said light source communicating with a fiber optics bushing, and an air exhaust zone open to the ambient atmosphere including perforated exhaust baffle members forming a light impervious air exhaust labyrinth, said light generating zone being generally disposed between said air inlet zone and said air exhaust zone, and said baffle members including a substantially non-reflective coating.

14. A light tight optical fiber illuminator system of claim 13 wherein said baffle members comprise overlapping plates.

15. A light tight optical fiber illuminator system of claim 13 wherein the light impervious air inlet and exhaust labyrinths are generally within said opaque illuminator case.

16. A quiet optical fiber illuminator system comprising:

an illuminator case with a plurality of zones disposed generally therein in aerodynamic communication with one another, including an air inlet zone open to the ambient atmosphere having perforated inlet baffle members defining a light impervious air inlet labyrinth, a light generating zone including a light source, said light source communicating with a fiber optics bushing, and an air exhaust zone open to the ambient atmosphere including perforated exhaust baffle members forming a light impervious air exhaust labyrinth, said light generating zone being generally disposed between said air inlet zone and said air exhaust zone, and said air exhaust zone being at least about 3 percent more constricted than said air inlet zone.

17. A quiet optical fiber illuminator system of claim 16 wherein said air exhaust zone is at least about 6 percent more constricted than said air inlet zone.

18. A quiet optical filter illuminator system of claim 16 including an air transport zone within said illuminator case.

19. A quiet light tight optical filter illuminator system comprising:

an opaque illuminator case with a plurality of zones disposed generally therein in aerodynamic communication with one another, including an air inlet zone open to the ambient atmosphere having perforated inlet baffle members defining a light impervious air inlet labyrinth, a light generating zone including a light source, said light source communicating with a fiber optics bushing, and an air exhaust zone open to the ambient atmosphere including perforated exhaust baffle members forming a light impervious air exhaust labyrinth, said light generating zone being generally disposed between said air inlet zone and said air exhaust zone, said baffle members including a substantially non-reflective coating, and said air exhaust zone being at least about 6 percent more constricted than said air inlet zone.

* * * * *